United States Patent
Kado et al.

[11] Patent Number: 5,995,639
[45] Date of Patent: *Nov. 30, 1999

[54] APPARATUS FOR IDENTIFYING PERSON

[75] Inventors: Yoshiyasu Kado, Kadoma; Masamichi Nakagawa, Hirakata; Kunio Nobori, Kadoma, all of Japan

[73] Assignee: Matsushita Electric Industrial Co., Ltd., Osaka, Japan

[ * ] Notice: This patent issued on a continued prosecution application filed under 37 CFR 1.53(d), and is subject to the twenty year patent term provisions of 35 U.S.C. 154(a)(2).

[21] Appl. No.: 08/343,543

[22] PCT Filed: Mar. 28, 1994

[86] PCT No.: PCT/JP94/00493

§ 371 Date: Nov. 29, 1994

§ 102(e) Date: Nov. 29, 1994

[87] PCT Pub. No.: WO94/23390

PCT Pub. Date: Oct. 13, 1994

[30] Foreign Application Priority Data

Mar. 29, 1993 [JP] Japan ................................ 5-069605

[51] Int. Cl.⁶ .................................................. G06K 9/00
[52] U.S. Cl. .................................................. 382/118
[58] Field of Search ..................... 382/118, 115, 382/215, 203, 241, 190, 195, 201; 395/119, 120, 126, 127, 125, 152, 135, 118; 345/418–435, 473, 126, 138; 351/200

[56] References Cited

U.S. PATENT DOCUMENTS

| | | | |
|---|---|---|---|
| 4,819,192 | 4/1989 | Kuragano et al. | 395/126 |
| 5,008,946 | 4/1991 | Ando | 382/201 |
| 5,012,522 | 4/1991 | Lambert | 382/2 |
| 5,293,427 | 3/1994 | Ueno et al. | 382/100 |
| 5,351,834 | 10/1994 | Duss | 382/218 |
| 5,448,687 | 9/1995 | Hoogerhyde et al. | 395/125 |
| 5,561,718 | 10/1996 | Trew et al. | 382/118 |
| 5,659,625 | 8/1997 | Marquardt | 382/118 |

FOREIGN PATENT DOCUMENTS

| | | |
|---|---|---|
| 63-177273 | 7/1988 | Japan . |
| 5-006419 | 1/1993 | Japan . |
| 5-197793 | 8/1993 | Japan . |

OTHER PUBLICATIONS

J.T. Tou and R.C. Gonzalez, Pattern Recognition Principles, Addison–Wesley Publishing, p. 75–83. 1974.

S.–Y. Guan, B.H. McCormick, Design for a 3D Deformable Brain Atlas, Computer–Based Medical Systems, Proceedings of the Fourth Annual IEEE Symposium, 1991.

*Primary Examiner*—Jon Chang
*Assistant Examiner*—Jayanti K. Patel
*Attorney, Agent, or Firm*—McDermott, Will & Emery

[57] ABSTRACT

The present invention inputs a face image through an image input section, extracts feature points of face components such as an eye, nose, mouth from the input face image, and divides the face image into many patches according to predetermined rules to describe the face image as a set of patches. Then the present invention extracts a feature amount for each patch to describe the face image as a set of feature amounts to identify a person.

3 Claims, 8 Drawing Sheets

Fig.3

All vertices and contour of a face

Fig.4

F. Ps. of eyebrow

Fig.5

F. Ps of eye

Fig.6

F. Ps. of Nose

Fig.7

F. Ps. of Mouth

Fig. 8

Top of head
F. Ps. of eyebrow
F. Ps. of eye
F. Ps. of nose
F. Ps of mouth
F. Ps. of face contour

Standard structure model

APPARATUS FOR IDENTIFYING PERSON

FIELD OF THE TECHNOLOGY

The present invention relates to apparatus for identifying persons such as identifying persons by their face images in their admission to a room or searching and outputting the name of a person whose face image resembles an input face image.

BACKGROUND TECHNOLOGY

As a prior apparatus for identifying persons by their face images there is one described in Japanese Pat. laid-open Publication No. Sho 63-177273. The composition of that apparatus is described in the following.

Figure 15:
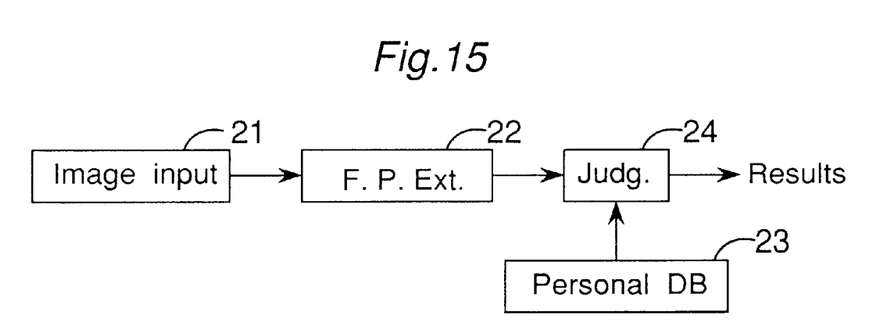
FIG. 15 is block diagram showing the composition of a prior apparatus for identifying persons.

FIG. 15 shows a block diagram showing a composition of the prior apparatus for identifying persons by their face images. In the Figure, 21 is an image input section that inputs a face image, 22 is a feature-points extracting section comprising an analog-to-digital converter, a central processor, and a memory, 23 is a personal database section that records people's feature points on cards or the like, 24 is a judgment section that uses the feature-points information of above feature-points extracting section 22 and the feature-points information of personal database section 23 to detect their difference and identifies the person having that face image as the person of personal database 23 based on the test whether the difference is greater than a threshold value or not.

The above prior technology extracts, in feature-points extracting section 22, feature points of a person's face image input from image input section 21 and detects, in judgment section 24, the differences between these feature points and the feature points of a face image registered in personal database section 23, and identifies the person based on the amount of the difference. In this case, if the sizes of the two images are different, or if their photographing angles are different, then the differences in the feature points become great, so that even the same person is identified as a different person. In order to avoid such a situation, it was necessary to fix the distance between the image input section and a photographed person and to make him or her face turned straight toward the front. However, this method of inputting a face image imposes a burden on the photographed person, and no matter how hard the person tries to turn straight to the front, a slight rotation and inclination are inevitable, so that it was difficult to obtain an image exactly facing the front.

The basic object of the present invention is to provide an apparatus for identifying persons having high discriminating power.

Another object of the present invention is to provide an apparatus for identifying persons that performs identification with high accuracy against minor fluctuations of photographing conditions such as illumination conditions and the position of the face.

DISCLOSURE OF THE INVENTION

In order to achieve the aforementioned objective, the present invention extracts feature points of face components such as the eyes, nose, mouth, and uses the extracted feature points to divide a face image into small patches of, for example, triangles and describe a face image as the set of these patches. Then a feature amount is extracted for each patch and the set of extracted feature amounts is used to identify the face image of a person. As a feature amount, the average brightness of each patch can be used. In this case, the face image is treated as a monochromatic image, so that the processing can be simplified, and the image formed by obtained patches having graded brightnesses sufficiently reflects the characteristics of the face, that is, concavo-convexity, flatness, curvature and the like are indirectly expressed. Therefore, by using these features, identification of a person can be performed accurately. Besides average brightness, the difference in brightnesses between adjacent patches can be used as a feature amount.

A practical method applies a standard structure model that describes a standard face image as a set of patches. When the feature points of an input face image is extracted, they are compared with the feature points of the standard structure model, and the standard structure model is deformed and adjusted based on the extracted feature point information, to obtain an adjusted structure model corresponding to the input face image. The adjusted structure model obtained in this way is expressed as a set of patches as described above, and a feature amount is extracted for each patch.

The extracted feature amounts are compared with the feature amounts of each person in the personal database to detect the degree of agreement by calculating a distance between the feature amounts. In case of confirming a specific person, the extracted feature amounts are compared with the feature amounts of the specific person. In case of searching for identification, the extracted feature amounts are successively compared with the data stored in the personal database to extract a face image having a large degree of agreement.

The standard structure model may be either 2-dimensional or 3-dimensional. In the 3-dimensional case, if the normal vector of each patch is extracted as well as its brightness, then the concavo-convexity of the face is expressed more clearly, and the position of the light source can be estimated from the distribution of the brightnesses, so that correction depending on the position of the light source can be made possible. Further, if the face is slightly inclined against the camera, errors due to the inclination can be prevented by a correction such that the brightness distribution becomes bilaterally symmetric.

BRIEF DESCRIPTION OF THE DRAWINGS

The characteristics and objects of the present invention will become clear from the following description taken in conjunction with the preferred embodiments thereof with reference to the accompanying drawings.

BEST FORM FOR IMPLEMENTING THE INVENTION

In the following is described embodiments of the present invention.

System Configuration

Figure 1:
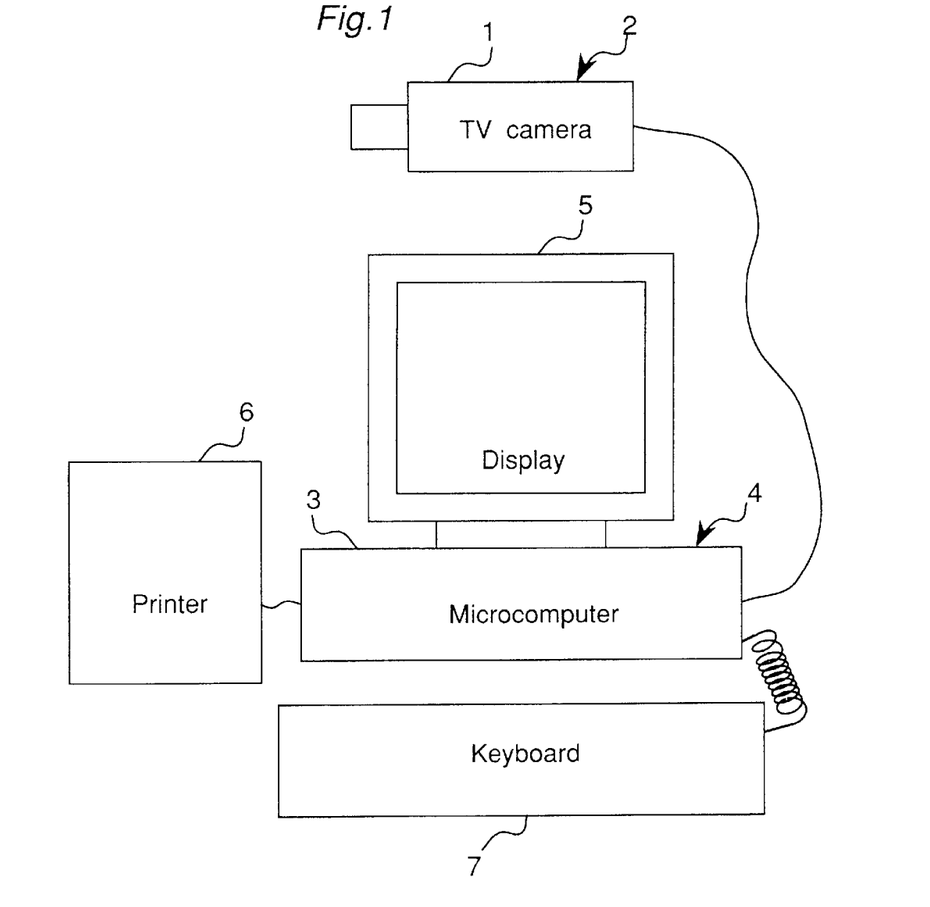
FIG. 1 is a system configuration diagram of an apparatus for identifying persons in accordance with the present invention.

The hardware of an apparatus in accordance with the present invention is, as shown in FIG. 1, basically comprised of an image input section 2 consisting in a TV camera 1 that takes a picture of a person to be identified and an image processing section 4 comprising a microcomputer 3 to which the data of a face image photographed by TV camera 1 is input. The image processing section 4 has, in addition to microcomputer 3, a display 5 that displays necessary information, a printer 6 that records necessary information, an operation means 8 comprising a keyboard 7, a mouse (not illustrated) and the like for operating microcomputer 3.

Functional Block Composition

Figure 2:
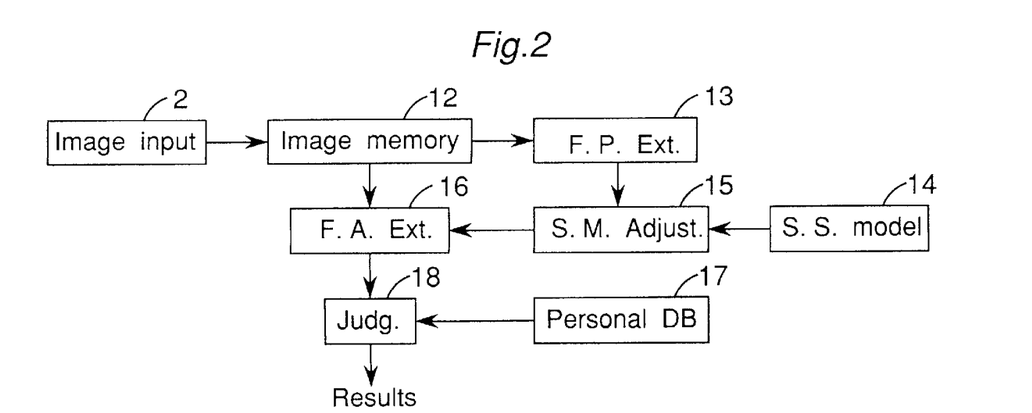
FIG. 2 is a block diagram of an embodiment of an apparatus for identifying persons in accordance with the present invention.

FIG. 2, which shows a first embodiment of the present invention, extracts, as functions, the contents of image processing that is performed by microcomputer 3 for an input face image, and expresses the functions as a block diagram.

Figure 6:
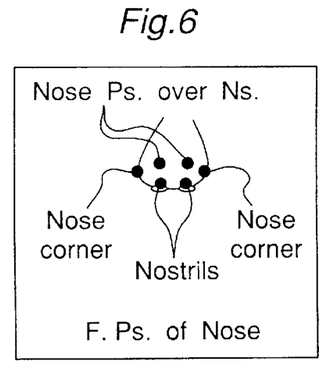
Figure 7:
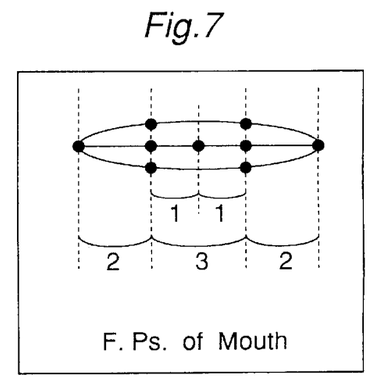
Figure 8:
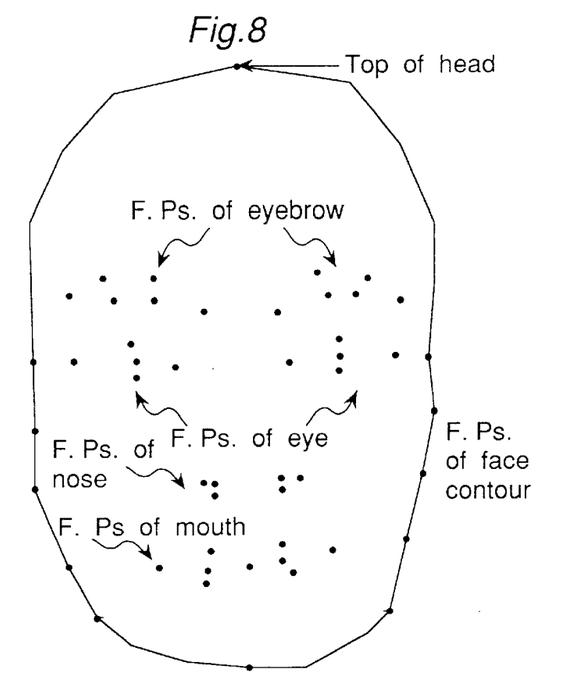
FIG. 8 is an illustration showing a distribution of extracted feature points.

Face image data input from image input section 2 is first stored in an image memory 12, and a feature points extracting section 13 extracts feature points from the stored face image, as described in the following. Here, the term "feature point" means a predetermined point for specifying an individual component such as an eye, nose, mouth, head, and cheek. Therefore, the extraction of feature points means, for example, to detect where the center of the pupil of an eye is located in an input face image, and the characteristics of an individual face are described by detecting the position information of individual feature points. FIGS. 4, 5, 6 and 7 respectively show the feature points of an eyebrow, eye, nose and mouth in details. The method of extracting feature points is described later. FIG. 8 shows an example of extracted feature points.

Feature points, whose positions are specified by feature points extracting section 15 are individually compared with the feature points of a predetermined standard structure model of a face, and the standard structure model is deformed and adjusted so that an individual feature point of the standard structure model becomes in agreement with the corresponding extracted feature point.

Figure 9:
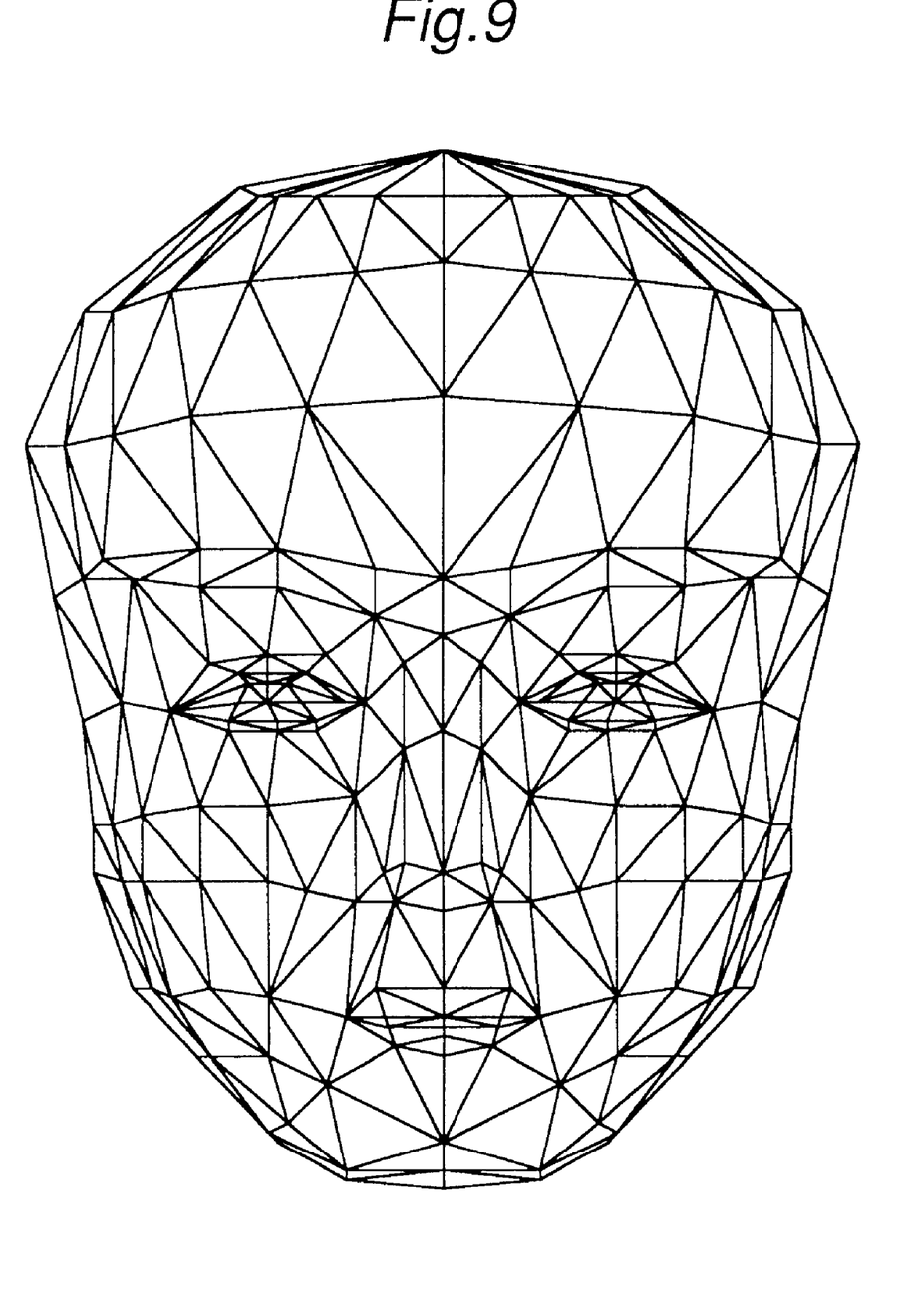
FIG. 9 is an illustration showing the frame structure of a standard structure model.
Figure 10:
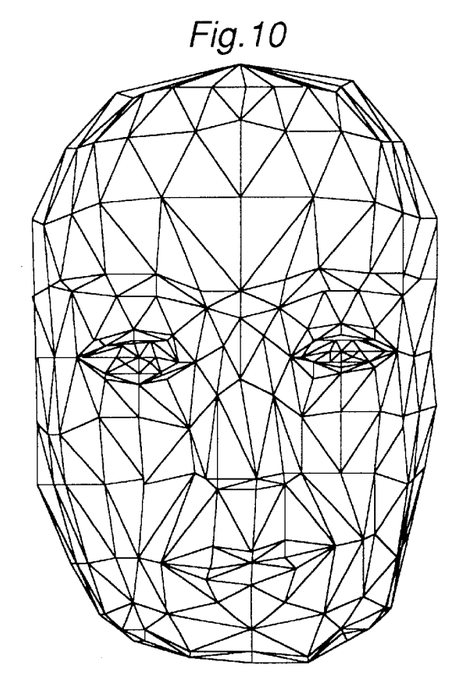
FIG. 10 is an illustration showing the frame structure of the result obtained by deforming and adjusting the standard structure model based on extracted feature points.

The standard structure model is sometimes called a standard wire model, and as exemplified in FIG. 9, the standard face image is divided into many small patches and approximately expressed as the set of the patches. Each patch may be a polygon, but a triangle is preferably used for ease of processing, as shown in FIG. 10. A concrete method of adjusting is described later. FIG. 10 shows an adjusted result obtained from the standard structure model of FIG. 9 using the extracted feature points shown in FIG. 8. In the following, a structure model obtained by the adjustment is called adjusted structure model.

Back to FIG. 2, a feature amounts extracting section 16 cuts out the part of a face image for each patch stored in image memory 12 to extract a feature amount for the patch based on structure model adjustment section 15. As the feature amount, for example, the average brightness of each patch is used. If the average brightness is used as the feature amount, the brightness distribution over a face comparatively faithfully reflects the three-dimensional shape of a face under definite illumination conditions. Also, the brightness distribution has an advantage of not greatly being affected by a slight change in the angle of the face at the photographing time. The feature amount is not limited to the brightness of each patch (average brightness), and the difference in the brightnesses of adjacent patches can be used.

When the feature amounts of an adjusted structure model are extracted in this way, a judgment section 18 successively compares the extracted feature amounts with the feature amounts of persons prepared in a personal database 17, judges a degree of agreement through distance computation, and outputs the result (identification search).

In case of identification checking, that is, when whether an input face image is that of a specific person or not is checked, judgment section 18 calculates the distance (the absolute value of the difference) between each extracted feature amount and the corresponding feature amount of the specific person stored in personal database 17, and if the total sum of the distances is less than a predetermined threshold value, the input face image is positively identified as that of the person of personal database 17.

Figure 11:
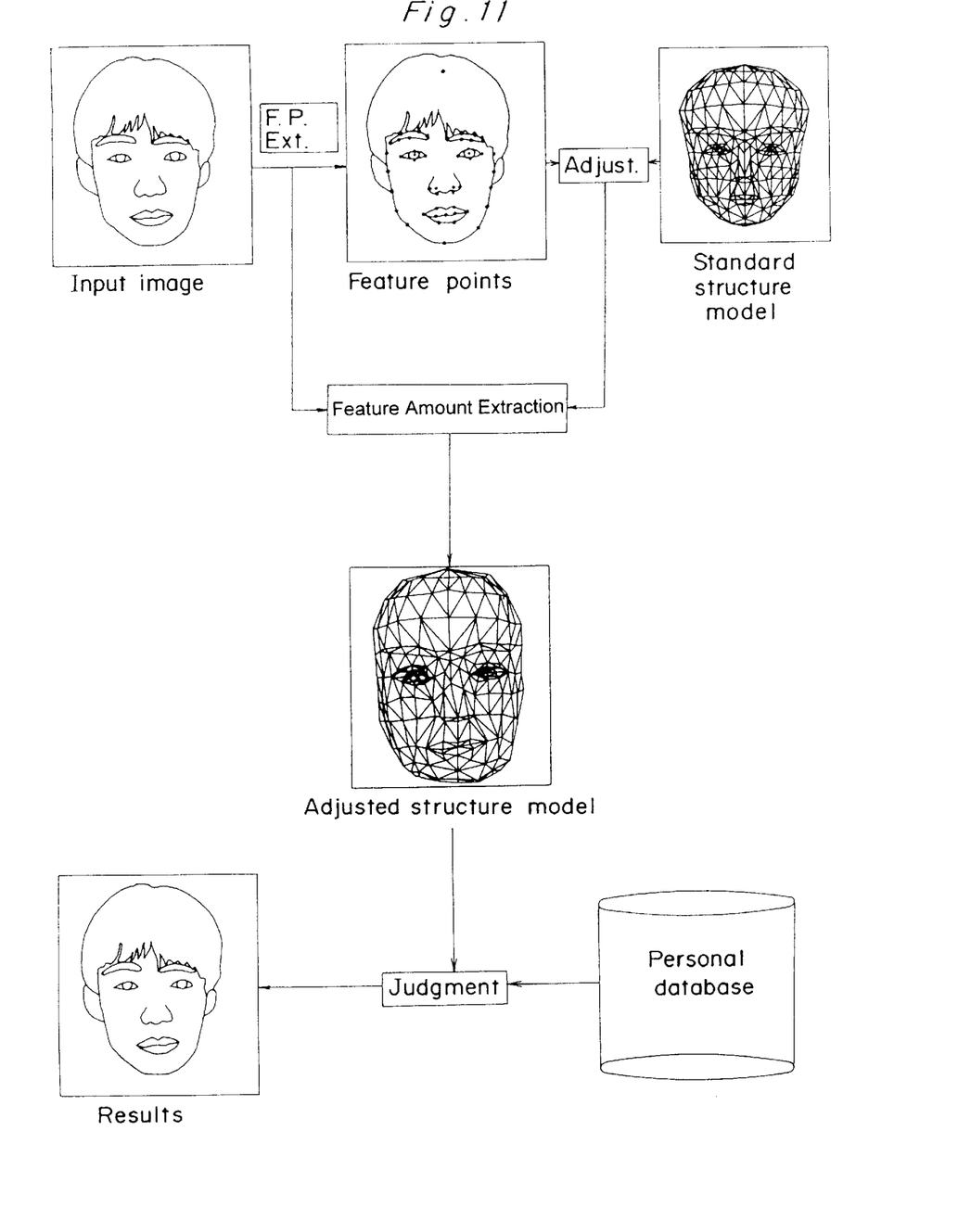
FIG. 11 is an illustration showing a system diagram of an apparatus for identifying persons in accordance with the present invention.

FIG. 11 illustrates the above personal identification processing, and the procedure of the processing will be clearly understood by the illustration.

Next, individual processing is described in more details.

Feature Points Extraction

The method of extracting the feature points described in the following is not a feature of the present invention, which, however, presumes a method of extracting the feature points. The presumed method of extracting the feature points is described in the public report, which the present applicants had already applied for a Japanese patent as a Japanese Pat. Appl. No. Hei 4-9753, and was laid open as a Japanese Pat. laid-open publication No. Hei 5-1997793. The basic principle of the method is described using the flowchart of FIG. 12.

The extraction of the feature points is, as stated above, performed in feature points extracting section 13.

Figure 12:
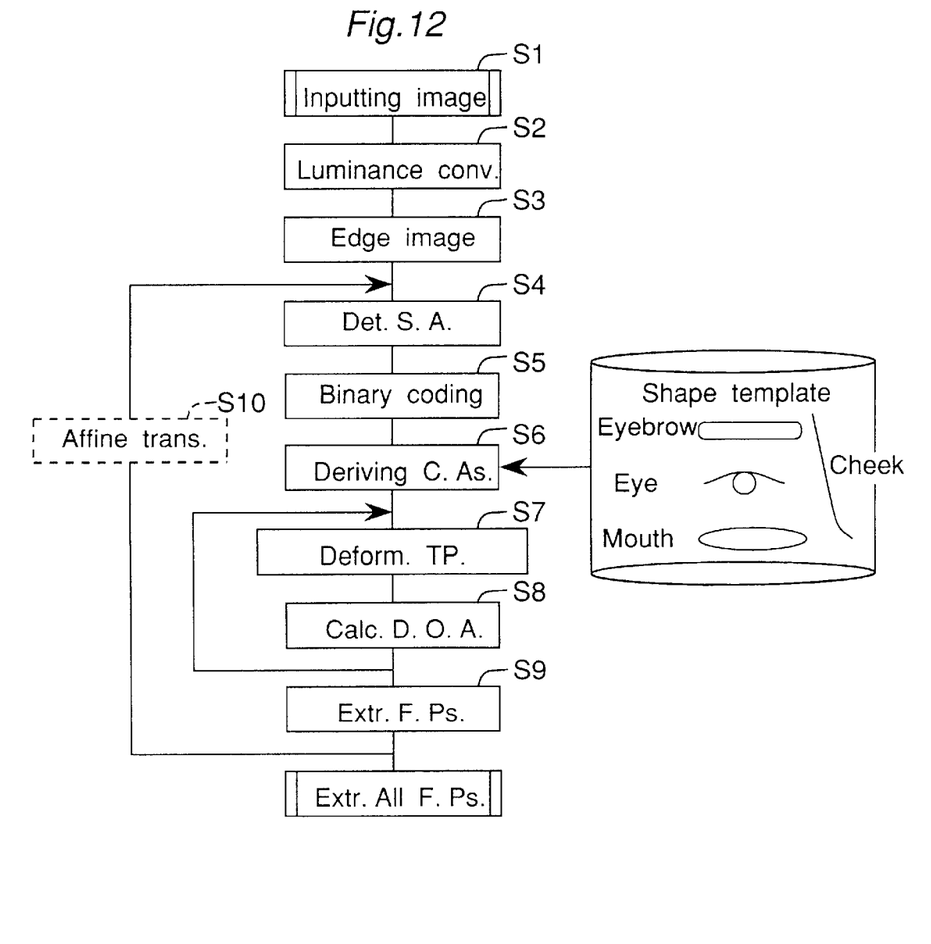
FIG. 12 is a flowchart of extracting feature points.

First, step S1 inputs a face image stored in image memory 12, and after step S2 luminance-converts to generate a monochromatic graded image, step S3 generates an edge image. In this case, an operator that obtains not only the magnitude of an edge but its direction, such as the Sobel operator, which is described in Computer Vision, D. H. Ballard and C. M. Brown, Translated by Akio Fukumura, Japan Computer Association 1987, p. 98, is used to extract an edge. An edge obtained in this way is called an edge vector, since its components are magnitude and direction. An edge image obtained by the edge extraction can not be vividly illustrated, but is displayed by display 5 in such a way as horizontal edges are displayed in green, vertical edges are displayed in red, and the magnitude of edges are displayed by brightness.

Next, step S4 determines search areas that show where the face components such as an eye and nose are located. These search areas consist of the eyebrow areas, iris area, nose area, right cheek area, left cheek area, and mouth area. First, the locations of the right and left irises are determined from the search area of the irises which are positioned in the middle of the vertical direction. When the locations of the right and left irises are detected, the size of the whole face is estimated from the distance between the irises and the inclination of the irises. The other four areas are successively determined using the obtained locations of the irises.

After all search areas are determined, step S5 converts the edge image of each search area into a binary expression. Each extracted edge has a magnitude and contains noise. The binary coding is performed for the purpose of eliminating noise, and a predetermined threshold value is used. The threshold value is determined so that, in the area, 20% of the edge pixels in a search area become 1 and the remaining edge pixels become 0.

Next, step S6 performs shape matching for the binary-coded edge image using shape templates to deduce a candidate area by judging a degree of agreement. The degree $\phi$ of agreement is obtained, for example, by calculating the inner product of two vectors, because the edges and the shape data of each component of a shape template are both expressed by vectors.

More specifically, if the edge vectors of an edge image are $$u_{i,\,j}=(u_x,\,u_y)\ (i,\,j:\text{the } x \text{ and } y \text{ coordinates of an image, } u_x^2+u_y^2=1 \text{ or } 0)$$

and if the shape data is element data $p_k=(l_k,\,m_k)$ ($l_k,\,m_k$: the x and y coordinates of an element)

slope vector $v_k=(v_x,\,v_y)$ ($V_x^2+v_y^2=1$)

where $1 \leq k \leq n$ (n is the number of elements)

then the degree of agreement in the coordinates (i, j) of the edge image with the shape data $\phi$ becomes $$\phi=(\Sigma U_{i+lk,\,j+mk}\cdot v_k)/n (1 \leq k \leq n)$$

where $$u_{i+lk,\,j+mk}\cdot v_k = u_x \times v_x + u_y \times v_y$$

In this way the degree of agreement for each pair of coordinates in the search area with the shape data is calculated. Then a plurality of pairs of coordinates having great degrees $\phi$ of agreement is made a candidate area of the face component.

In practice, for example, in case of an eye template, the two irises, eyebrows, the hair part between a cheek and an ear, a nostril and the like are listed as parts having high degrees of agreement. In other words, if a shape template of irises is used to judge the degree of agreement, then the parts mentioned above are derived as a candidate area of the irises.

Next, step S7 judges matching (degree of agreement) for each edge image of a candidate area obtained as described above, by deforming the corresponding shape template. The method of the deformation is to deform a shape template to improve the degree of agreement by shifting the elements of the shape template of each component and by calculating the degree of agreement with each edge image (step S7). If the highest degree of agreement is obtained (step S8), then step S9 extracts a feature point from the shape of the shape template at this time.

Figure 4:
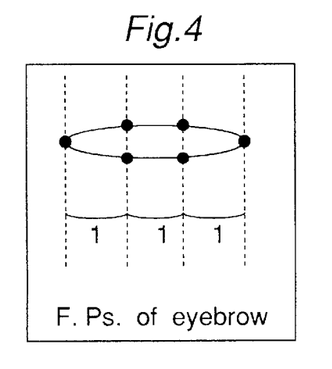
FIGS. 4, 5, 6 and 7 are enlarged illustrations respectively showing feature points of an eyebrow, eye, nose, and mouth.
Figure 5:
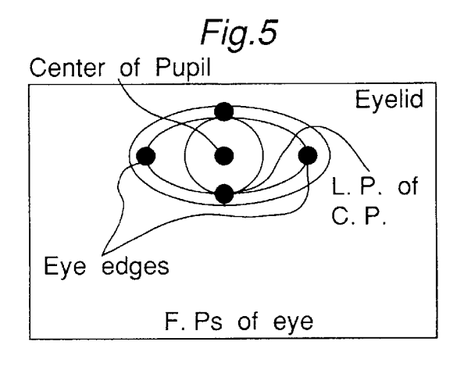

Extraction of feature points is performed, for example, as shown in FIG. 4 for an eyebrow. In a matched eyebrow shape, i.e. having the highest degree of agreement, the left and right terminal points are first taken as feature points. Then the 4 points where two perpendicular trisectors of the segment between the two terminal points cross the upper and lower rims are taken as feature points. Therefore, total 6 points are extracted as the feature points of an eyebrow. The feature points of the nose and mouth are extracted respectively as shown in FIGS. 6 and 7.

Actual extraction of feature points are not shown in the flowchart of FIG. 12, but performed in the following order.

First, the irises are extracted. As described above, when the locations of the irises are obtained, the size, inclination and the like of the whole face can be estimated. If the inclination of the two irises (slope of the line segment connecting the feature points) is found, the inclination of the input whole face is found. Therefore, when step S9 extracts the feature points of the irises, step S10 applies an affine transformation to the edge image.

After the affine transformation, extraction of the feature points of the eye contours is performed. When the eyes are extracted, then the locations of the eyebrows can be estimated, so that the feature points of the eyebrows are extracted. Further, by extracting the mouth, the locations of the nose and chin can be estimated, so that the feature points of these components are extracted. Finally, the feature points of the top of the head and the cheek contours are extracted. Extraction of feature points are not necessarily performed in the above order, but if the extraction is performed in that order, extraction of feature points is performed smoothly. In this way, extraction of the all feature points is performed, and the routine of feature points extraction is completed.

Adjustment Processing Routine for the Structure Model

Figure 3:
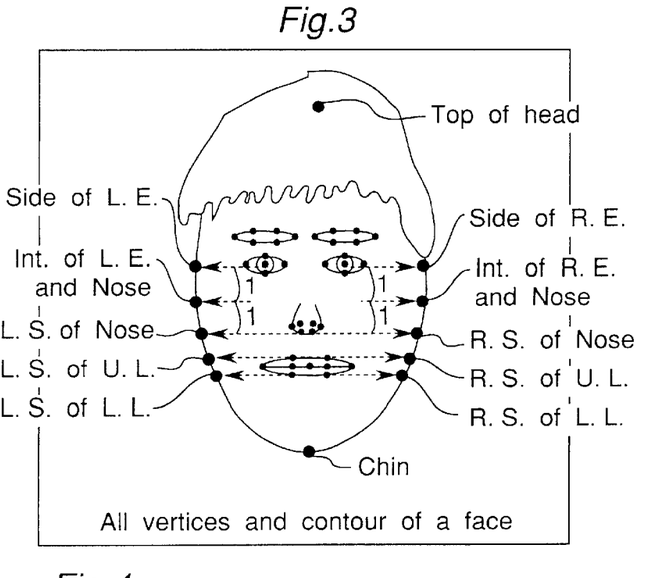
FIG. 3 is an illustration showing feature points of a face.

After features point extracting section 13 extracts the total 49 feature points (see FIG. 3), structure model adjustment section 15 performs deformation and adjustment of the standard structure model (FIG. 9).

The standard structure model consists of the data of 205 vertices and 385 triangular patches created by connecting these vertices. Since the connected structure is invariant, an adjusted structure model is obtained by adjusting the vertices data.

The adjustment is performed in the following rules.

(a) If a vertex to be adjusted is a feature point (for example, the center of an iris, the corner of an eye, the corners of the mouth etc.), then the coordinates of the extracted feature point are used for those of the vertex as they are.

(b) If a vertex to be adjusted is not a feature point, then 3 feature points are selected according to a predetermined rule, and a linear interpolation is performed using the coordinates of these feature points in the following way.

The method of the linear interpolation is described with reference to FIG. 13.

Figure 13:
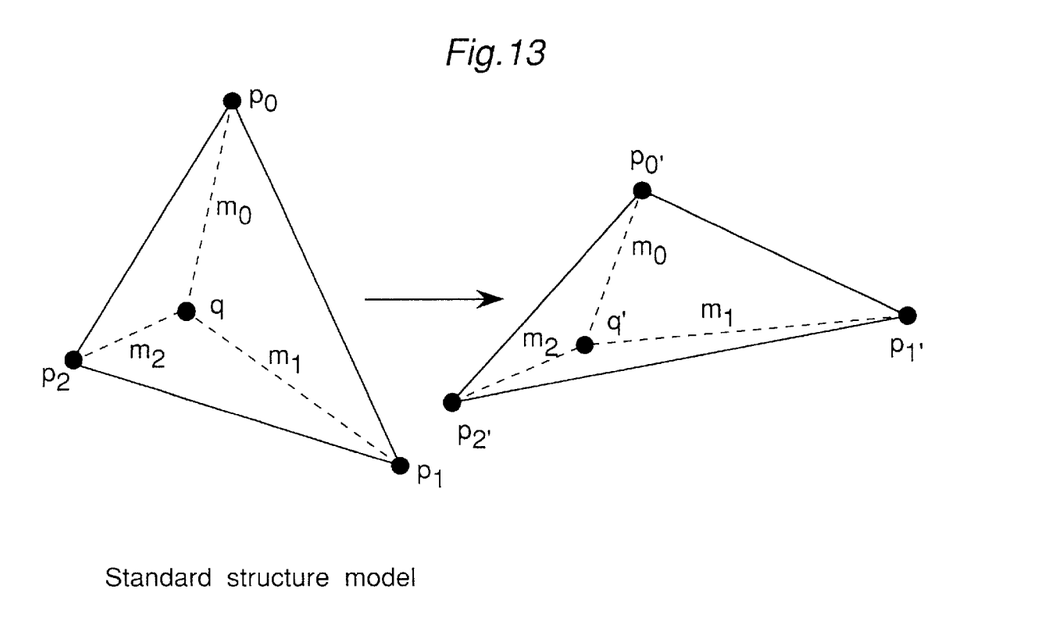
FIG. 13 is an illustration for describing a linear interpolation of a vertex.

In FIG. 13, the triangle on the left side $P_0P_1P_2$ is the triangle formed by 3 feature points $P_0$, $P_1$, $P_2$ surrounding a vertex q on the standard structure model, and the triangle on the right side $P_0'P_1'P_2'$ is the triangle formed by 3 feature points $P_0'P_1'P_2'$ extracted corresponding to the feature points $P_0$, $P_1$, $P_2$ on the standard structure model. The point q' is a vertex obtained by interpolating the above vertex q on the standard structure model. If the coordinates of feature points $P_0$, $P_1$, $P_2$ are respectively $(x_0, y_0)$, $(x_1, y_1)$, $(x_2, y_2)$, the coordinates of vertex q is (x, y), and the ratio of the weights of feature points $P_0$, $P_1$, $P_2$ are $m_0$, $m_1$, $m_2$, then $m_0$, $m_1$, $m_2$ can be obtained by solving the following 3 equations.

$$m_0+m_1+m_2=1$$

$$x=m_0x_0+m_1x_1+m_2x_2$$

$$y=m_0y_0+m_1y_1+m_2y_2$$

Next, if the coordinates of the corresponding feature points $P_0'$, $P_1'$, $P_2'$ of the deformed structure model, i.e. adjusted structure model, are respectively $(x_0', y_0')$, $(x_1', y_1')$, ($x_2'$, $y_2'$), then the desired coordinates (x', y') of the vertex q' are obtained in the following using the obtained weight ratios $m_0$, $m_1$, $m_2$.

$$x' = m_0 x_0' + m_1 x_1' + m_2 x_2'$$
$$y' = m_0 y_0' + m_1 y_1' + m_2 y_2'$$

The selection rules of the feature points are as follows.

Rule 1. The 3 points form a triangle.

Rule 2. Before and after the deformation, the orientation is invariant, i.e. the clockwise order is invariant ($P_0 \rightarrow P_1 \rightarrow P_2 : P_0' \rightarrow P_1' \rightarrow P_2'$).

Rule 3. The vertex q exists inside the triangle.

Rule 4. $P_0$, $P_1$, $P_2$ exist as near as possible to the vertex q.

The linear interpolation is performed for all the 205 vertices, as a result, an adjusted structure model as shown in FIG. 10 is obtained. Here, since the perimeter of the standard structure model should be formed with feature points only, structure model adjustment section 15 approximates the perimeters of the head, chin, and etc. using functions such as quadratic functions.

Brightness Correction

The brightness correction is performed to prevent misjudgment due to a difference in the position of the light source in photographing.

Figure 14:
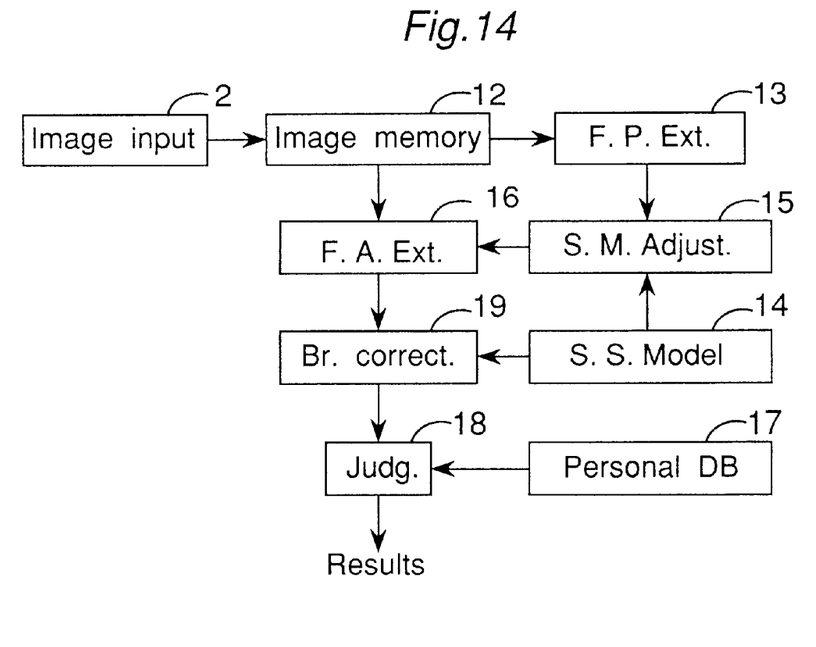
FIG. 14 is a block diagram showing another embodiment of an apparatus for identifying persons in accordance with the present invention.

As shown in FIG. 14, a brightness correcting section 19 that corrects the brightness of the face image is installed following feature amounts extracting section 16. In this case, standard structure model 14 stores beforehand the normal vector of each patch as data. That is, the standard structure model is made three-dimensional by giving the normal vector of each patch. Feature amounts extracting section 16 extracts the brightness and normal vector of each patch for the adjusted structure model obtained by structure model adjustment section 15. The position of the light source is estimated by the extracted brightnesses and normal vectors of the patches. For example, if a face image is divided into 4 parts with horizontal and vertical lines. By observing the brightness distribution over the 4 parts, the direction in which the light source is directed to the photographed face can be estimated. If the estimated position of the light source is different from the position of the light source at the time of creating the personal feature amounts stored in personal database 17, then the brightnesses are corrected to adjust them to one of the positions of the light source. That is, the brightness of a patch whose normal is closer to the old direction of the light source is lowered, and the brightness of a patch whose normal is closer to the new direction of the light source is raised. By performing such brightness correction, misjudgment can be prevented under different illumination conditions.

Although the present invention has been fully described in connection with the embodiments, the present invention is not limited to the above embodiment, and changes and modifications apparent to those skilled in the art are included within the scope of the present invention as defined by the appended claims unless they depart therefrom.

Possible Industrial Applications

According to the composition of the present invention, personal identification and identification checking can be performed with high accuracy using feature amounts extracted from a great number of small parts.

What is claimed is:

1. An apparatus for identifying persons comprising:

an image input section that inputs a personal face image of a person to be identified;

an image memory section that stores the personal face image input by said image input section;

a feature points extracting section that extracts predefined feature points from the personal face image stored in said image memory section;

a feature amounts extracting section that divides the personal face image into small polygons based on the extracted feature points according to a predefined rule, thereby describing the personal face image as a set of the small polygons and extracts feature amounts for respective small polygons; and a judgement section that calculates distances between the feature amounts extracted by said amounts extracting section and feature amounts extracted beforehand with respect to each person to be identified and judges whether the person having said personal face image input by said image input section is the person to be identified;

wherein said feature amounts extracting section comprises a standard structure model that describes a presumed standard face as a set of small polygons defined on the basis of standard feature points predefined with respect to said standard face; and a structure model adjustment section that deforms the standard structure model based on the feature points extracted by said points extracting section so as to match the personal face image with the deformed standard structure model, and uses each difference in an average brightness between adjacent two small polygons of the matched personal face image as the feature amount.

2. An apparatus for identifying persons comprising:

an image input section that inputs a personal face image of a person to be identified;

an image memory section that stores the personal face image input by said image input section;

a feature points extracting section that extracts predefined feature points form the personal face image stored in said image memory section;

a feature amounts extracting section that divides the personal face image into small polygons based on the extracted feature points according to a predefined rule, thereby describing the personal face image as a set of the small polygons and extracts feature amounts for respective small polygons; and a judgement section that calculates distances between the feature amounts extracted by said amounts extracting section and feature amounts extracted beforehand with respect to each person to be identified and judges whether the person having said personal face image input by said image input section is the person to be identified;

wherein average brightness at respective small polygons of the matched personal face image are used as the feature amounts, a position of a light source for illuminating a personal face relative to the personal face is estimated based on a distribution of the average brightness, and each average brightness is corrected based on the estimated position of the light source.

3. An apparatus for identifying persons comprising:

an image input section that inputs a personal face image of a personal to be identified;

an image memory section that stores the personal face image input by said image input section;

a feature points extracting section that extracts predefined feature points from the personal face image stored in said image memory section;

a feature amounts extracting section that divides the personal face image into small polygons based on the extracted feature points according to a predefined rule, thereby describing the personal face image as a set of the small polygons and extracts feature amounts for respective small polygons; and a judgement section that calculates distances between the feature amounts extracted by said amounts extracting section and feature amounts extracted beforehand with respect to each person to be identified and judges whether the person having said personal face image input by said image input section is the person to be identified, wherein said feature amounts extracting section comprises a standard structure model that describes a presumed standard face as a set of small polygons defined on the basis of standard feature points predefined with respect to said standard face; and a structure model adjustment section that deforms the standard structure model based on the feature points extracted by said points extracting section so as to match the personal face image with the deformed standard structure model, wherein said standard structure model is a three-dimensional model defined by small polygons and their normal vectors, wherein the normal vector of each small polygon is detected together with an average brightness of each small polygon, and wherein a position of a light source for illuminating a personal face relative to the personal face is estimated based on the detected normal vectors and average brightness.

* * * * *